March 31, 1970  D. R. MUELLNER  3,503,306
POSITIVE PRESSURE DETENT AND RELEASE APPARATUS
FOR CONTROL VALVES
Filed July 23, 1968  3 Sheets-Sheet 2
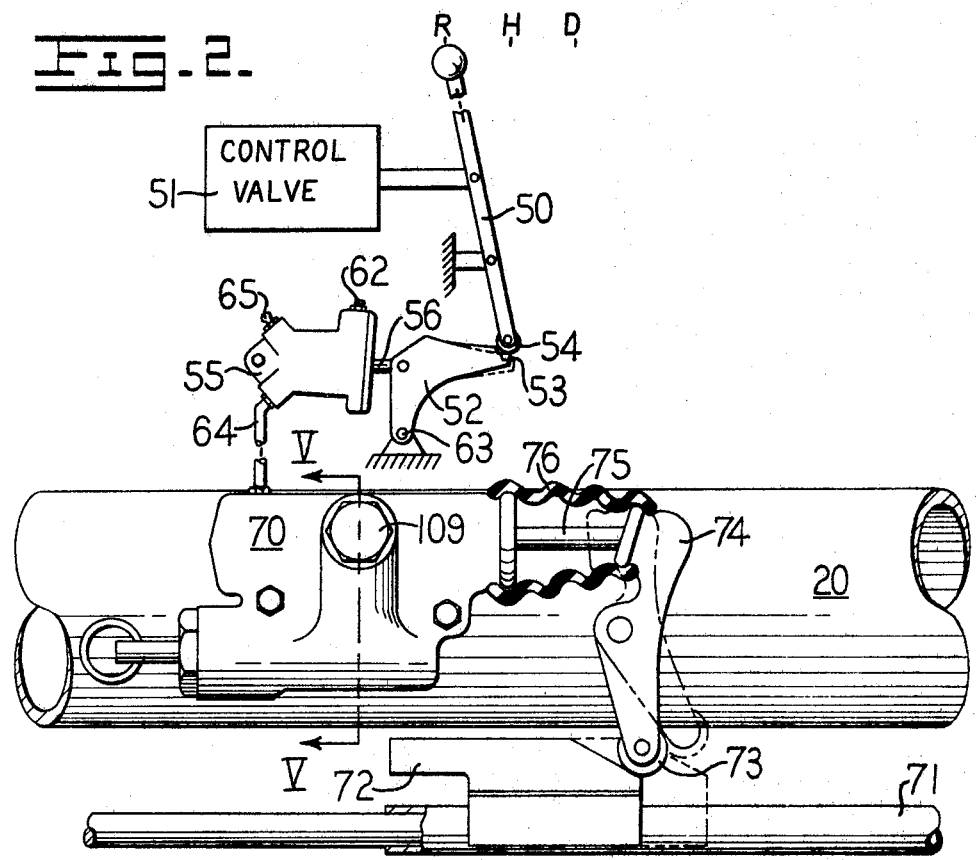
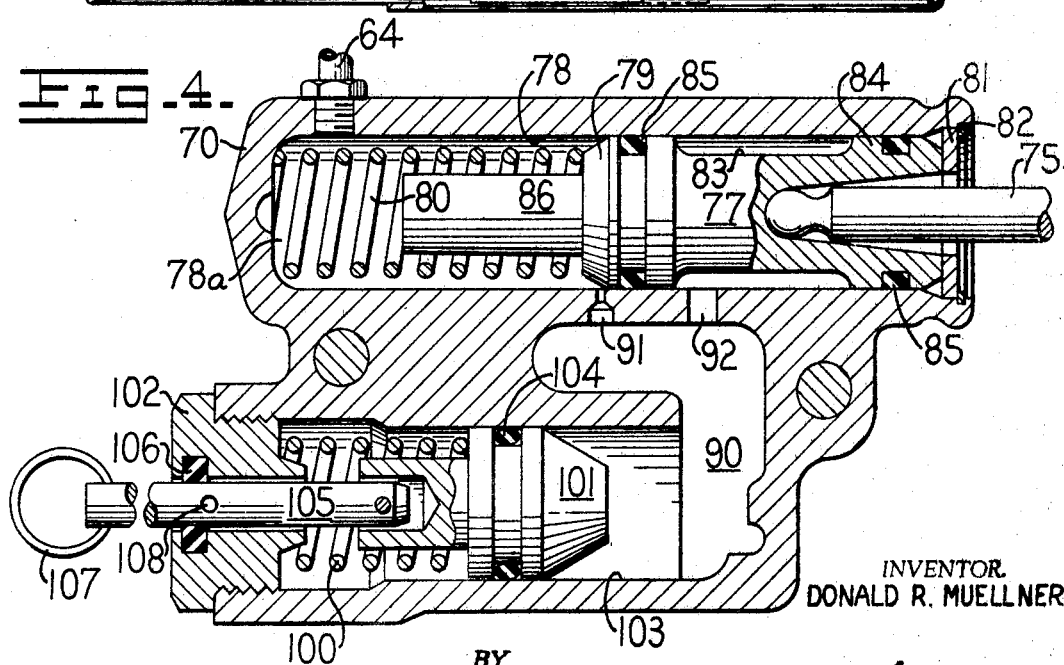
INVENTOR.
DONALD R. MUELLNER
BY
ATTORNEYS

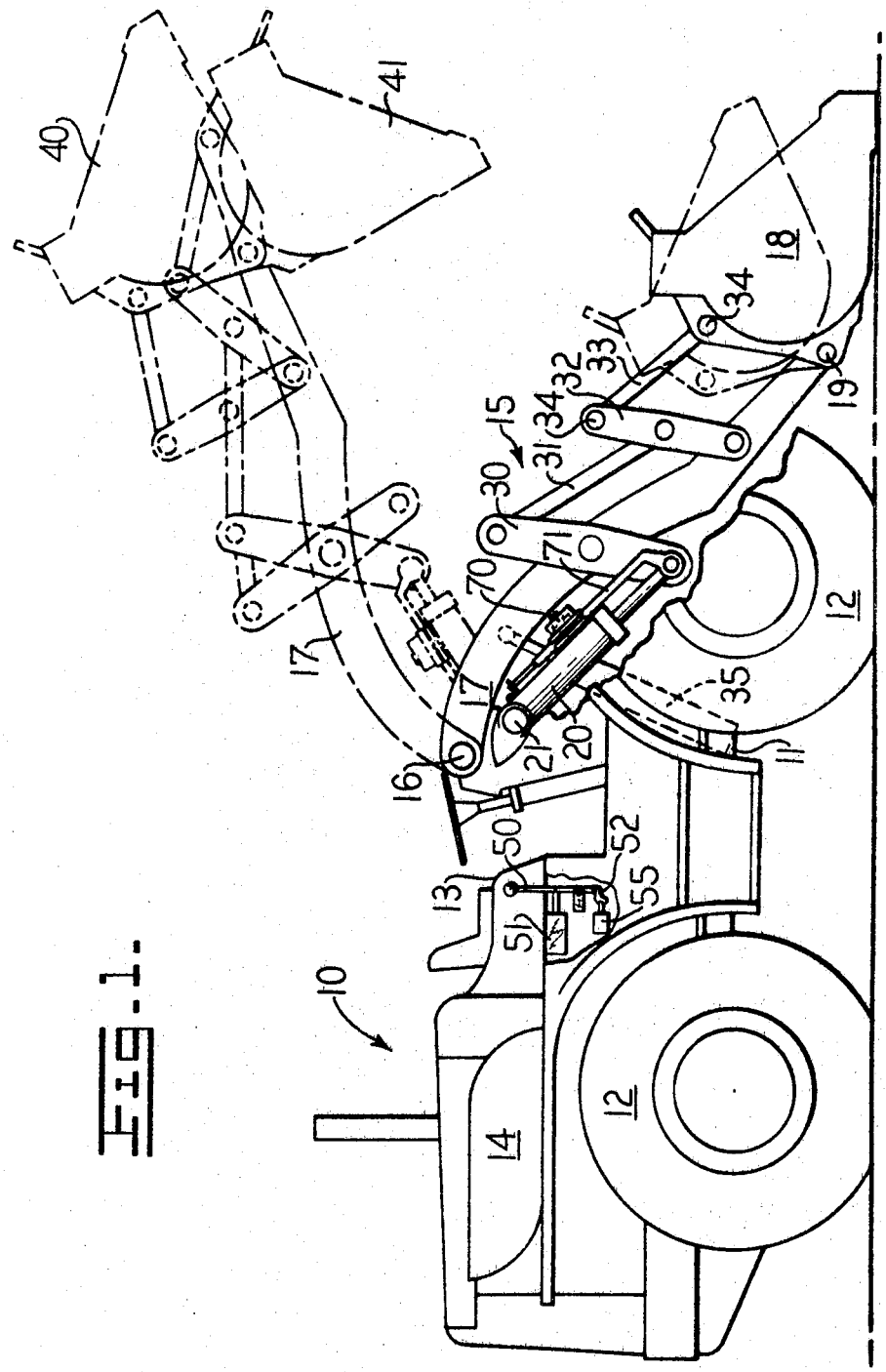

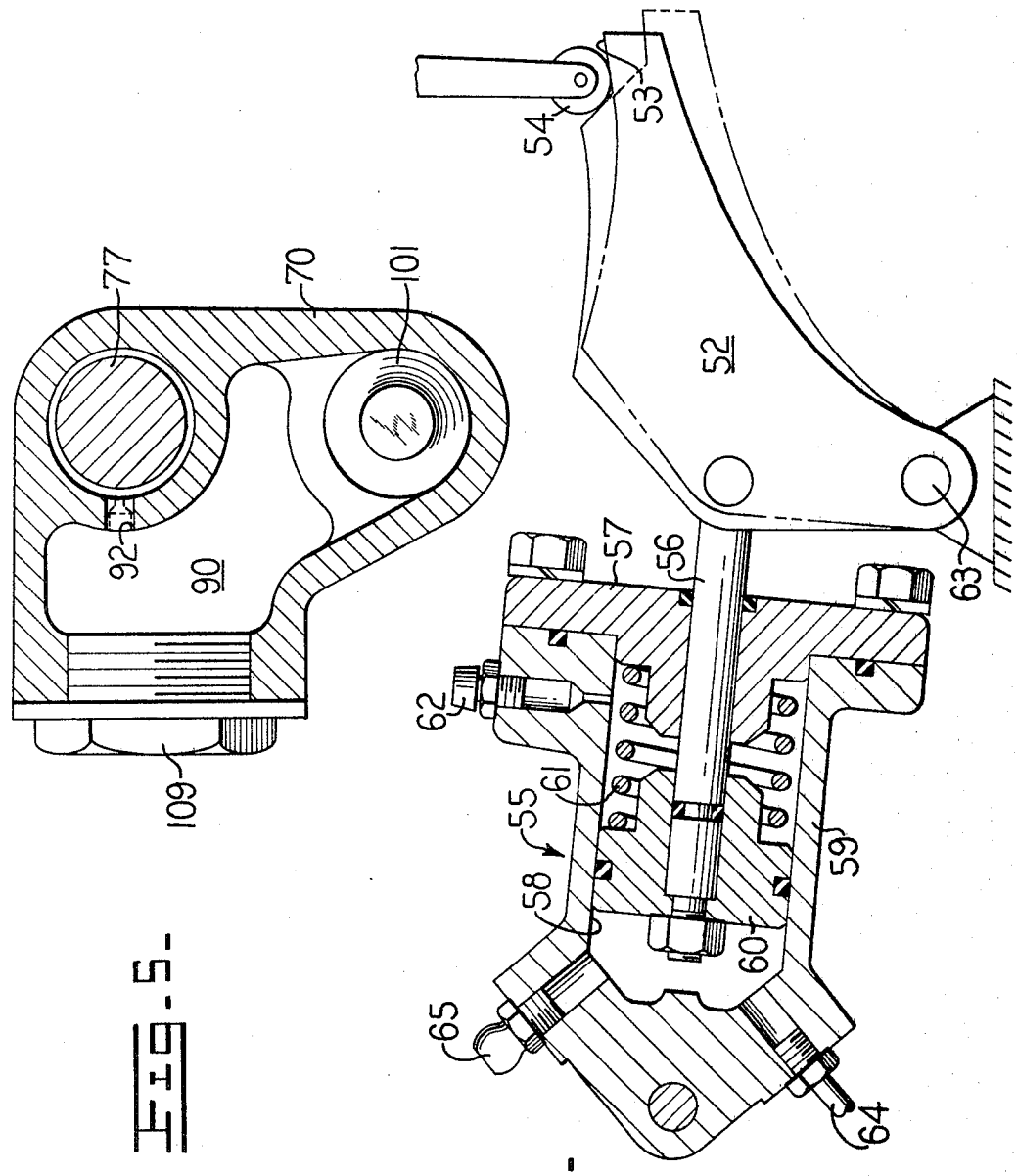

United States Patent Office 3,503,306
Patented Mar. 31, 1970

3,503,306
POSITIVE PRESSURE DETENT AND RELEASE
APPARATUS FOR CONTROL VALVES
Donald R. Muellner, Aurora, Ill., assignor to Caterpillar
Tractor Co., Peoria, Ill., a corporation of California
Filed July 23, 1968, Ser. No. 746,939
Int. Cl. F15b 13/16, 7/00; F01b 31/00
U.S. Cl. 91—388                                    5 Claims

ABSTRACT OF THE DISCLOSURE

In many modern day hydraulic systems employing spring centered control valves, these valves often must be manually held in an open position until a desired actuation has occurred. Detents holding such valves in the open position with release means triggered by the completion of the desired actuation are often desirable to free the operator's hands for other operations. The current invention is an improved cam detent and release apparatus for use with spring centered control valves having a hydraulic receiver operable to release the control valve spool from a cam maintained open position and a remote hydraulic sender connected to the receiver through a conduit in which a pressurized reservoir maintains a minimum positive static pressure system at all times.

BACKGROUND OF THE INVENTION

Hydraulically actuated implements on tractors, such as the bucket assembly on a loader, can advantageously employ a detent and release system with the control valve designed to maintain the valve in an open position until the bucket has reached a preselected position, at which time an automatic release or trip will disengage the valve spool so it will center under the influence of its centering springs, shutting off the flow of hydraulic fluid to the actuator.

Several different types of detent and release systems are often employed in such applications. A purely mechanical catch and mechanical release system employing linkages is disclosed in U.S. Patent No. 2,853,200 issued to Byerstedt. Another common type of detent and release system employs a mechanical catch and a release system actuated by an overpressure surge in the hydraulically actuated system when an actuator reaches the end of its travel, such as shown in U.S. Patent No. 2,689,585 issued to Presnell. More common are the detent and release systems employing detent means located in or adjacent to the control valve with a receiver unit and a remotely located sender or transmitter unit which senses the desired actuation and sends a signal to the receiver unit for releasing the control valve from a detent maintained open position. Signals in such receiver-transmitter type systems can be electrical, or can be hydraulic signals as employed in systems illustrated in U.S. Patent No. 3,155,253 issued to Pilch.

This invention relates to the latter types of automatic control systems and more particularly to cam detent and release systems employing a hydraulic signal from the transmitter to the receiver for releasing the spring maintained cam detent mechanisms.

Such systems, as shown in the Pilch patent referenced above, often operate improperly as a result of temperature changes, introduction of air into the system, or the ingestion of foreign matter to the receiver and transmitter units. In addition, the hydraulic seals tend to dry out, increasing the likelihood of ingestion of foreign matter into the system, which often causes severe leakage after the machine has been idle for a weekend or like period.

SUMMARY OF THE INVENTION

Many of the problems noted above can be overcome with this invention. It is the combination of a spring centered control valve with a manually positionable control lever and a hydraulic actuator controlled by said valve, with an improved hydraulic operated cam detent and release system comprising a cam means adjacent said control lever operable to restrain said control lever in a valve open position when manually positioned thereto, a receiver means having a hydraulically actuated link connected to said cam means, said link being spring biased to maintain said cam in engagement with said control lever and hydraulically displaceable to effect disengagement, a sender means located adjacent said actuator means and connected to said receiver means via a conduit, said sender means including a positive pressure reservoir maintaining a minimum static pressure in the system at all times and a plunger operable to displace hydraulic fluid to said receiver means, and linkage means between the sender means and said actuator to depress said plunger when said actuator reaches a preselected position releasing said control lever.

BRIEF DESCRIPTION OF THE DRAWINGS

FIG. 1 is an elevation view of a loader having the improved cam detent and release mechanism incorporated therein with parts broken away to show greater detail;

FIG. 2 is a schematic of various portions of the improved cam detent and release system apart from the loader to illustrate the complete system;

FIG. 3 is a section through the receiver unit and shows its association with the cam mechanism for restraining a control lever of a control valve;

FIG. 4 is a section of the sender or transmitter unit employing a positive pressure reservoir; and FIG. 5 is a cross-section through the reservoir of the sender showing the filler plug.

DESCRIPTION OF A PREFERRED EMBODIMENT

A loader 10 is shown in FIG. 1 illustrating a type of vehicle on which the instant invention can be employed. It includes a frame 11 supported on tires 12 and has an operator's station 13. A power plant 14 is located at the rear of the vehicle and a loader linkage 15 is pivotally supported on shaft 16 on the forward end of the vehicle through a pair of spaced-apart lift arms 17. On the outboard end of the lift arms, a bucket 18 is pivotally mounted to oscillate about pivot points 19 when tilt jacks 20 are actuated. One end of each tilt jack is pivoted on the frame with a pin 21 and the other end of each jack is connected to an associated tilt linkage for the bucket.

The tilt linkages, duplicated on both sides of the vehicle, include a lever 30 having a central pivot on its associated lift arm 17, and each lift arm is connected at one end to a rod link 31 which, in turn, is connected to the central portion of an idler lever 32. The opposite end of each lever 30 connects to one of the tilt jacks 20. Each idler arm is journaled at one end on its associated lift arm and its outboard end is connected to the upper portion of bucket 18 through a drag link 33 and pins 34. Through proper design of the tilt linkages, the bucket will be maintained in a constant orientation as the lift jacks 35, connected between the frame and the lift arms, raise or lower the outboard ends of the lift arms without any actuation of tilt jacks. In FIG. 1, the bucket is shown in a load position with broken lines 40 showing the carry position and broken lines 41 illustrating the dump position.

After dumping a load, the operator will often desire that the bucket articulate from a dump position 41 to a load position as the lift arms are lowered to ready the machine for loading. Since this cycle takes time, it is more convenient for the operator to place the control lever 50 in an "on" position and leave it until the desired bucket position is reached at which time the valve should be returned to neutral, preferably automatically.

This invention provides an improved cam detent and release system holding the tilt control valve 51 in an open or "on" position until the bucket reaches the preselected position. The full system is best shown in FIG. 2, in combination with the spring centered tilt control valve and associated tilt control lever 50. The cam detent includes a pivoted cam 52 having a recess 53 which receives roller 54 on the control lever when the latter has been moved to the rack position, designated as R in the drawings. Springs inside the receiver or slave unit 55 through rod 56 urge the cam into engagement with the roller until the operator manually overrides this detent position or the receiver unit automatically tips the cam to release the roller, allowing the centering springs in the control valve to return it to neutral.

The receiver unit 55 is best shown in FIG. 3 where it can be seen that rod 56 passes through a dirt seal in the end wall 57 closing the open end of a blind bore 58 in the housing 59 in which piston 60 reciprocates. The piston is connected to the rod and a spring 61 between the end wall and the piston, urges the piston into the bore causing cam 52 to rock toward the receiver when the roller 54 comes into registry with the recess on the cam surface. As the cam is rocked about its pivot point 63, the roller and recess will move into or out of engagement forming a detent means for holding the control valve in an open position. If an operator desires, he can override the detent means by merely moving the control lever 50 from R to its center or neutral position. In the improved system, such manual override will not ingest air into the hydraulic system which is a common failing in prior art devices.

Automatic release of the cam detent means is accomplished by introducing hydraulic fluid into a chamber formed between piston 60 and the blind end of the bore 58 via a conduit 64 from a remote sender or master unit. A bleed fitting 65 also communicates with this chamber to purge the air from the system after initial filling or replenishing with oil.

Any leakage across the seal on the piston into the chamber containing spring 61 will be vented through breather 62 to prevent a hydraulic lock in the system.

Conduit 64 is connected to the sender or master 70 best shown in FIG. 4, which is usually located adjacent the actuator being controlled by this invention and in case of the current disclosure, the tilt jacks of the loader. One of these jacks includes a sensor rod 71 connected to move in unison with the actuation of the jack and carries an adjustable ramp or stop 72 that engages a roller 73 on a pivoted lever arm 74 which depresses a rod actuator 75 in the sender unit, generating the pressure signal (flow of hydraulic fluid) to the receiver. A boot 76 covers the rod actuator to keep foreign material away from the exposed reciprocating parts of the sender or master unit.

As can be seen in FIG. 4, the rod actuator 75 engages a piston assembly 77 which is reciprocably mounted in a blind bore 78 so that a chamber 78a is formed between the bottom of the bore and the piston head 79 of the piston assembly. A spring 80 located in this chamber urges the piston assembly out of the bore against a retaining washer 81 and associated snap ring 82.

The piston assembly 77 includes a spool having a reduced central section 83 between the piston head 79 and a rear land 84 which stabilizes the spool and bore 78. Both the piston head and rear land include a seal 85 to prevent the leakage of fluid as the piston assembly is reciprocated in the bore under the influence of rod actuator 75 and spring 80. Movement of the piston assembly into the bore will trap hydraulic fluid in chamber 78a and route the hydraulic fluid through conduit 64 to receiver 55 as the ramp or stop 72 causes the rod actuator to push the piston assembly into its spring when the tilt cylinder obtains a preselected position. A boss 86 on the piston assembly centers spring 80 on the head end of the spool and functions as an internal stop limiting the total fluid displacement of the piston assembly.

When the piston assembly is against the retaining washer 81, a pressurized reservoir 90 has two ports in communication with blind bore 78. A replenishing port 91 communicates with the chamber 78a when the piston assembly is in this position but is closed from chamber 78a as soon as the piston head of the latter moves into spring 80 so that the hydraulic fluid in this chamber will be trapped and sent to the receiver 55. Since the reservoir is pressurized, hydraulic fluid can flow into or out of chamber 78a so that the static pressure in the system is always the same as reservoir pressure, notwithstanding temperature changes. Further this eliminates the need for expensive check valves to bleed off excess pressure due to thermal changes. Also, the pressurized reservoir will prevent the ingestion of air into the hydraulic system when the detent position is manually overriden since the hydraulic fluid from the pressurized reservoir will automatically provide additional fluid to the system.

Also, a lubrication port 92 leads from the reservoir to bore 78 in the area of the reduced central section 83 of the spool. Through this port, pressurized fluid from the reservoir is introduced around the spool and in the area of the seals 85 to lubricate the system, thereby increasing the service life of the high pressure seal on the piston head of the piston assembly.

Static pressure in the reservoir 90 is supplied by a spring 100 between a piston 101 and a cap 102 threaded into bore 103, which reciprocally receives the piston. The piston acts on the body of fluid in the reservoir and leakage around this piston is prevented by its seal 104. Spring pressure on the piston maintains a positive static pressure in the system at all times which prevents the seals from drying out and dirt being ingested into the system. The positive static pressure in the reservoir is not sufficient to cause an actuation of the receiver unit and, therefore, only when the ramp or stop actuates the sender unit will the cam detent means be automatically released.

The reservoir charging piston 101 is connected to a pull pin 105 which extends through dirt seal 106 in the cap and has a ring 107 attached to its outboard end. Pulling the pin outwardly, compresses spring 100 and exposes a hole 108 in the pin through which a key can be inserted to hold the pin outward during replenishing of the reservoir. Replenishing is accomplished with the pull pin extended by removing plug 109 (see FIG. 5), filling the reservoir, and replacing the plug after which the pull pin is allowed to move into the reservoir to supply the static pressure on the system. At this time, any air in the system is purged.

The amount of extension of the pull pin beyond the cap indicates the volume of hydraulic fluid in the reservoir system and serves as a useful visual indicator of fluid condition therein. Markings can be placed on the pull pin to provide a quick visual indication of the fluid quantity in the reservoir which eliminates the conventional techniques of removing the filler plug and visually inspecting the level therein.

The improved cam detent and release system described above is economical to manufacture since it eliminates many of the check valves required in the prior art systems. Further, it provides an excellent and reliable system unencumbered by ingested air and since it is independent of the main hydraulic system, brake fluid or other low viscosity fluids can be used making the system unaffected by temperature. In addition, since the system is not incorporated in the control valve structure, it can easily be used with stocked control valves when desired, eliminating the necessity for special construction in the valve structure themselves.

What is claimed is:

1. In combination with a spring centered control valve with a manually positionable control lever and a hydraulic actuator controlled by said valve, an improved hydraulic operated cam detent and release system comprising:
- a cam means adjacent said control lever operable to restrain said control lever in a valve open position when manually positioned thereto;
- a receiver means having a hydraulically actuated link connected to said cam means, said link being spring biased to maintain said cam in engagement with said control lever and hydraulically displaceable to effect disengagement;
- a sender means located adjacent said actuator means and connected to said receiver means via a conduit, said sender means including a positive pressure reservoir maintaining a minimum static pressure in the system at all times and a plunger operable to displace hydraulic fluid to said reeciver means; and
- linkage means between the sender means and said actuator to depress said plunger when said actuator reaches a preselected position releasing said control lever.

2. The combination as defined in claim 1 wherein the positive pressure reservoir includes a spring loaded piston to maintain static pressure in the system at all times.

3. The combination as defined in claim 2 wherein the spring loaded piston includes a pull pin connected thereto for relieving the pressure in the reservoir and visually indicating the quantity of fluid in said reservoir.

4. The combination as defined in claim 2 wherein the plunger is relieved so that fluid under static pressure is supplied on opposite sides of its high pressure seal.

5. The combination as defined in claim 4 wherein the static pressure is supplied to one side of the seal through a port which is closed off by the plunger when it is depressed by the linkage means so that hydraulic fluid will be trapped ahead of the plunger for actuating the receiver means.

References Cited
UNITED STATES PATENTS

| | | | |
|---|---|---|---|
| 3,063,425 | 11/1962 | Vier et al. | 91—388 |
| 3,289,546 | 12/1966 | Erickson. | |
| 3,400,634 | 9/1968 | Wirtz | 91—358 |
| 3,433,126 | 3/1969 | Hayner et al. | 91—388 |

PAUL E. MASLOUSKY, Primary Examiner

U.S. Cl. X.R.

60—54,5; 92—130